United States Patent [19]

Horwitz et al.

[11] Patent Number: 5,344,623

[45] Date of Patent: Sep. 6, 1994

[54] PROCESS FOR THE EXTRACTION OF STRONTIUM FROM ACIDIC SOLUTIONS

[75] Inventors: E. Philip Horwitz, Naperville; Mark L. Dietz, Evanston, both of Ill.

[73] Assignee: The United States of America as represented by the United States Department of Energy, Washington, D.C.

[21] Appl. No.: 76,881

[22] Filed: Jun. 15, 1993

[51] Int. Cl.$^5$ .............................................. C01F 13/00
[52] U.S. Cl. .......................................... 423/2; 423/18
[58] Field of Search .................. 423/2, 9, 11, 17, 18; 252/631

[56] References Cited

U.S. PATENT DOCUMENTS

| | | | |
|---|---|---|---|
| 4,208,377 | 7/1992 | Horwitz et al. | 423/18 |
| 4,574,072 | 3/1986 | Horwitz et al. | 423/9 |
| 5,100,585 | 3/1992 | Horwitz et al. | 252/631 |
| 5,110,474 | 5/1992 | Horwitz et al. | 423/2 |
| 5,167,938 | 12/1992 | Heaton et al. | 423/2 |
| 5,169,609 | 12/1992 | Horwitz et al. | 423/10 |

*Primary Examiner*—Donald P. Walsh
*Assistant Examiner*—Frederick H. Voss
*Attorney, Agent, or Firm*—Mark P. Dvorscak; Robert J. Fisher; William R. Moser

[57] ABSTRACT

The invention is a process for selectively extracting strontium values from aqueous nitric acid waste solutions containing these and other fission product values. The extractant solution is a macrocyclic polyether in an aliphatic hydrocarbon diluent containing a phase modifier. The process will selectively extract strontium values from nitric acid solutions which are up to 6 molar in nitric acid.

11 Claims, 4 Drawing Sheets

PROCESS FOR THE EXTRACTION OF STRONTIUM FROM ACIDIC SOLUTIONS

CONTRACTUAL ORIGIN OF THE INVENTION

The U.S. Government has rights in this invention pursuant to Contract No. W-31-109-ENG-38 between the U.S. Department of Energy and the University of Chicago.

BACKGROUND OF THE INVENTION

This invention relates to a process for the separation and recovery of strontium values from nuclear wastes. More specifically, this invention relates to an improved process for the separation and recovery of strontium values from nuclear waste reprocessing solutions containing these values together with actinide and other fission product values.

The removal of $^{90}$Sr from acidic high level liquid waste (HLLW) resulting from the processing of spent nuclear reactor fuels has long been recognized as a special problem. Strontium-90 and $Cs^{137}$ are the two major generators of heat in nuclear waste. Thus, their presence complicates waste management options. The radioactive waste process stream from spent fuel reprocessing often contains the transuranium elements (TRUs) neptunium, plutonium and americium, in addition to strontium and other components, in a solution with a high (1–6M) nitric acid content. Because of the long-lived nature of the TRU elements, it is anticipated that they will have to be stored in geologically stable storage facilities for periods of up to one million years. The strontium in the waste stream, if left in the waste as it is solidified for storage, will generate a significant amount of thermal energy which increases the space required for the storage of the waste canister. Thus, it is imperative that a satisfactory method be found for the removal of the strontium from the high-level liquid wastes before they are solidified into a form suitable for long term storage.

Strontium-90, because of the heat which it generates, is also valuable as a reliable source of thermal energy for use in radioisotopic thermal electric generators.

U.S. Pat. No. 5,100,585, assigned to the U.S. Department of Energy, and incorporated herein by reference, described a process for the recovery of strontium and technetium values from acidic feed solutions containing other fission product values and containing up to 6 molar nitric acid. As taught therein, the strontium and technetium values are selectively extracted from the acidic feed solution using a macrocyclic polyether in a suitable diluent which may be an alcohol, ketone, carboxylic acid, or ester. From a practical standpoint however, the diluent of choice is 1-octanol.

However, none of the above diluents are compatible with the normal paraffinic hydrocarbon (NPH) diluents used in either the PUREX or the TRUEX processes, the primary processes utilized in the processing of nuclear reactor fuel. This lack of compatability can complicate attempts to develop processes in which both transuranic elements and radiostrontium are sequentially removed from a given waste stream. Then too, because of their superior physical properties (e.g., lower volatility and higher flash point) and lower cost, paraffinic hydrocarbon diluents are preferable in any large-scale process to the alcohols, ketones, carboxylic acids and esters suggested as diluents by the prior art.

We have found that by combining certain phase modifiers with a paraffinic hydrocarbon diluent, we are able to utilize the crown ethers of the prior art as an extractant for the selective recovery of strontium from waste nitric acid feed solutions containing strontium together with other fission product values.

BRIEF SUMMARY OF THE INVENTION

The invention therefore is an improved process for recovering strontium values from an aqueous nitric acid feed solution containing these and other fission product values by contacting the aqueous solution containing the values with an organic extractant solution consisting of a crown ether in a diluent, said diluent being selected from the group consisting of either a neat (i.e., undiluted) phase modifier or a paraffinic hydrocarbon having from 10 to 15 carbons containing a phase modifier, maintaining this contact for a period of time sufficient for the strontium values to be taken up by the extractant solution, and separating the loaded extractant solution from the aqueous solution, thereby separating the strontium values from the aqueous acid feed solution.

The process of the invention may be used with the non-transuranium element-containing high radioactive level nitric acid waste stream (the raffinate) from the TRUEX process or it may be used as a separate process to recover strontium values from nitric acid-containing waste streams.

It is therefore one object of the invention to provide a process for the recovery of strontium values from acidic waste solutions containing strontium values together with other fission product values.

It is another object of the invention to provide a process for the recovery of strontium values from aqueous nitric acid solutions.

It is still another object of the invention to provide a process for the recovery of strontium values from aqueous nitric acid solutions containing up to 6 molar nitric acid.

Finally, it is the object of the invention to provide a process which utilizes crown ethers for the recovery of strontium values from aqueous nitric acid waste streams containing up to 6 molar nitric acid.

DETAILED DESCRIPTION OF THE INVENTION

Figure 1:
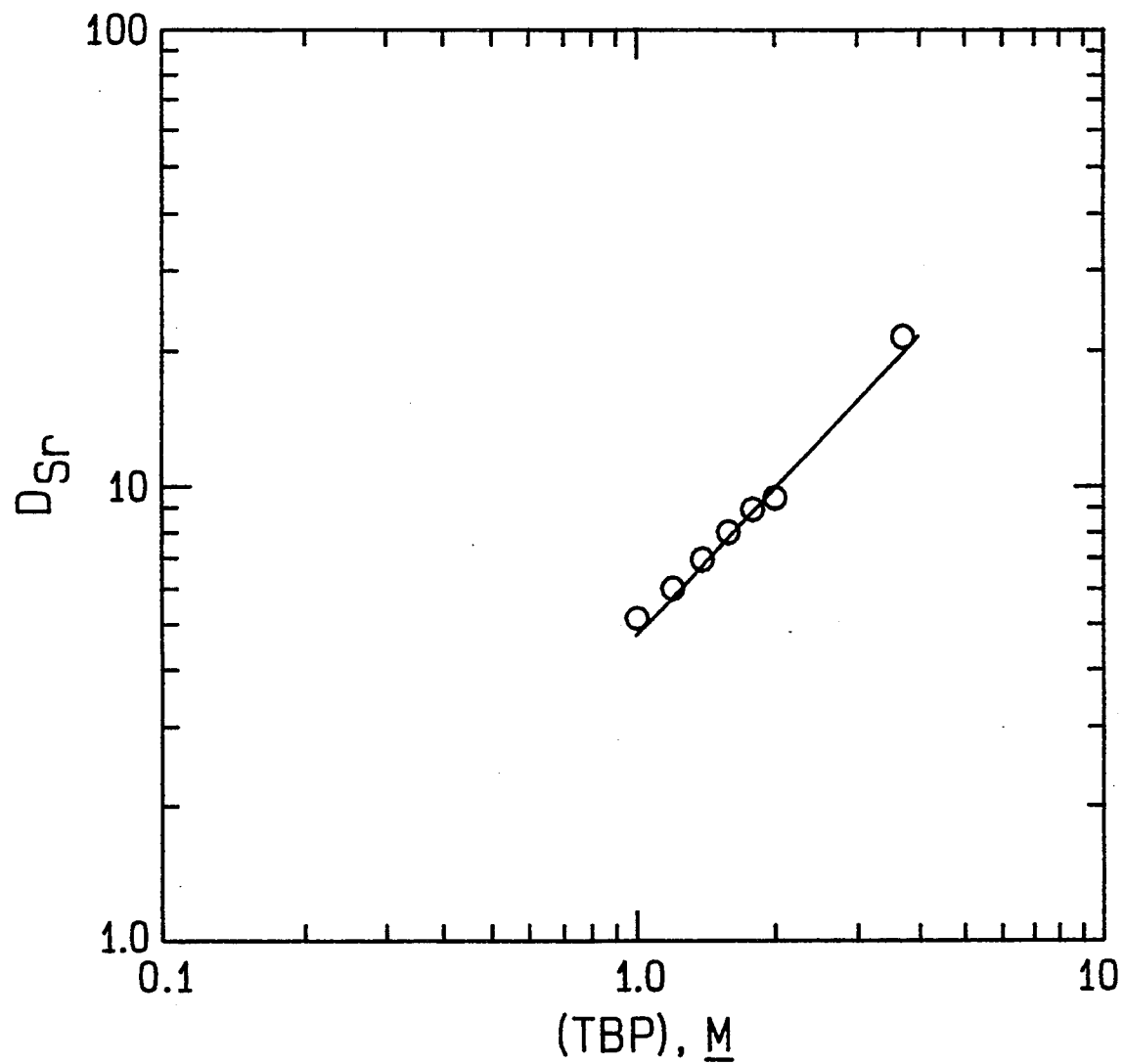
FIG. 1 is a graph of the effect of tributyl phosphate modifier concentration on $D_{Sr}$ obtained with an extraction solution comprised of 0.2M bis-4,4'(5')[t-butylcyclohexano]-18-Crown-6 (DtBuCH18C6) in Isopar ® L from 1M $HNO_3$.

These and other objects of the invention for the recovery of strontium values from aqueous nitric acid feed solutions containing these and other fission product values may be met by preparing an extractant solution of about 0.2M bis-4,4'(5')[(t-butyl)cyclohexano]-18-Crown-6 (hereinafter referred to as DtBuCH18C6) in a paraffinic hydrocarbon such as dodecane as a diluent and containing 1.2M tri-butyl phosphate as a phase modifier, contacting the extractant solution with the aqueous solution which is from 1 to 6M in nitric acid, maintaining the contact for a period of time sufficient for the strontium values to be taken up by the extractant, and separating the extractant from the aqueous solution, thereby separating the strontium values from the aqueous solution.

The macrocyclic polyether may be any of the dicyclohexano crown ethers such as dicyclohexano-18-Crown-6 (DCH18C6) or bis[methylcyclohexano]-18-Crown-6 (DMeCH18C6). More specifically, the preferred crown ethers have the formula: 4,4'(5')[(R, R')dicyclohexano]-18-Crown-6, where R and R' are one or more members selected from the group consisting of H and straight chain or branched alkyls containing 1 to 12 carbons. Examples include methyl, propyl, t-butyl, hexyl and octyl. The most preferred ether is bis 4,4'(5')[(t-butyl)cyclohexano]-18-Crown-6 (DtBuCH18C6). The amount of crown ether in the diluent may vary depending upon the particular form of the ether. For example, a concentration of about 0.1 to 0.5M of the t-butyl form in the diluent is satisfactory, with 0.2M being the most preferred. When the hydrogen form is used, the concentration may vary from 0.25 to 0.5M.

Suitable diluents for the extractant solution are organic compounds which have a high boiling point (i.e., about 170° C. or greater) and limited or no water solubility, which do not form a third phase upon contact with nitric acid, and in which the crown ether is sufficiently soluble. A suitable diluent is tri-n-butyl phosphate (TBP) which is also suitable as a phase modifier. However, TBP is quite viscous at normal operating temperatures making efficient phase mixing and rapid separation difficult. Other suitable diluents include normal or iso paraffinic hydrocarbons containing 10 to 15 carbons to which is added a small amount of an appropriate phase modifier such as TBP to prevent third phase formation, to enhance the solubility of the crown ether, and to boost the extractability of the strontium-crown complex. One suitable hydrocarbon is n-dodecane. Another suitable diluent is a mixture of n-paraffinic hydrocarbons containing 10 to 13 carbons, having a flash point above 69° C. and containing 13% $C_{10}$, 36% $C_{11}$, 44% $C_{12}$, and 47% $C_{13}$. This product is commercially available as Norpar ® 12. Still another diluent is a mixture of iso-paraffinic hydrocarbons containing 12 to 15 carbons, having a flash point of 80° C. and an average molecular weight of 191 which is available from EXXON as Isopar ® M. The preferred diluent is a mixture of iso-paraffinic hydrocarbons containing from 10 to 12 carbons, having a flash point of 61° C. and an average molecular weight of 171. This diluent is also available commercially from EXXON under the tradename of Isopar ® L.

The phase modifier is added to the extractant solution to improve solubility of the extractants in the organic diluent and to reduce or eliminate the formation of second organic phases. The preferred phase modifier is tri-n-butyl phosphate (TBP). Other organophosphorus compounds are also suitable, for example, diamyl amylphosphonate (DAAP). Also found to be effective is bis(2-,4,4-trimethylpentylphosphinic acid, available as an 85% solution having a flash point of 108° C. and a pour point of −32° C., commercially available as CYANEX ® 272. Also found effective is CYANEX ® 923, which is a mixture of four trialkylphosphine oxides $R_3P(O)$, $R_2R'P(O)$, $RR'_2P(O)$, and $R'_3P(O)$, wherein $R=CH_3(CH_2)_7$ and $R'=CH_3(CH_2)_5$, having an molecular weight of about 348 and a flash point of 182° C. Other organophosphorus compounds having similar properties should also be suitable for use as modifiers. The amount of phase modifier may range from about 1.0M to about 3.0M with the preferred molarity depending upon the particular modifier being utilized.

The temperature at which the separation process takes place is not critical and may vary from about 25° to about 60° C. with about 40° C. being the generally preferred temperature due to the self-heating effect of the radioactive solutions. Furthermore, the higher temperature helps to reduce the viscosity of the extractant solution, particularly when using TBP as the diluent, so that efficient contact and separation of the aqueous and organic phases can take place more easily. The upper temperature limit of the operation should be sufficiently below the flash point of the diluent being used to ensure safe operation.

In general, contact times are not critical, although 1 minute has been found to be satisfactory to achieve adequate mixing. The actual extraction operation can be carried out in either a batch or continuous mode using, for example, simple mixer-settlers, direct or countercurrent flow centrifugal contactors, or using similar conventional types of equipment known to those skilled in the art. Phase ratios can be varied depending upon engineering considerations and economic factors.

The volume ratio between the organic extractant and the aqueous acid feed solution depends upon the particular extractant system, i.e. the particular crown ether and diluent combination. Generally, these ratios may vary from about 1:1 to 1:4. For the extractant system consisting of 4,4'(5')[(t-butyl)cyclohexano]-18-Crown-6 in Isopar ® L containing about 1.2M TBP, the preferred ratio is 1:1.

Stripping the extracted strontium values from the extractant can be readily accomplished by contacting the extractant with water or with dilute nitric acid on the order of 0.01M to 0.05M.

The following examples are given to illustrate the invention but are not to be taken as limiting the scope of the invention which is defined in the appended claims.

EXAMPLES

The crown ether DtBuCH18C6 was recrystallized from methanol prior to use. All distribution ratios of Sr were measured radiometrically. Prior to a distribution experiment, the organic phase was pre-equilibrated by contacting it 2-3 times with twice its volume of an appropriate nitric acid solution. A 1.00 mL aliquot of this pre-equilibrated organic phase was then combined with an equal volume of fresh $HNO_3$ solution spiked with $^{85}Sr$. The two phases were vortexed for one minute, then centrifuged until complete phase separation was obtained. The $^{85}Sr$ activity in each phase was measured by gamma counting using a Beckman Biogamma Counter. All measurements were performed at 25±1 degrees C.

EXAMPLE I

A series of experiments were carried out to determine the distribution of strontium ($D_{Sr}$) obtained with various solvents and modifiers and to compare these with the prior art using 1-octanol alone. To this end, 1 ml portions of 0.2M DtBuCH18C6 in the various diluents containing 1.2M of the indicated modifiers were contacted with 1.0H HNO₃ spiked with ⁸⁵Sr. The results, as given in TABLE 1, show the effect of the various solvents and modifiers on the extraction of strontium. It is important to note that although the $D_{Sr}$ obtained with the crown ether in 1-octanol alone is larger than those obtained for the same crown ether in the various hydrocarbon/modifier mixtures, the latter results (with $D_{Sr}$'s from above 2 to greater than 8) are more than adequate for the large-scale recovery of strontium from large volumes of nuclear waste.

TABLE 1

Strontium Distribution Ratios Using 0.2M DtBuCH18C6 in Various Hydrocarbon Diluent/Modifier Combinations

| Solvent | Modifier | Dsr 0.05M HNO₃ | 3M HNO₃ |
|---|---|---|---|
| Norpar ® 12 | TBP | 0.0068 | 6.75 |
|  | DAAP | 0.0072 | 3.60 |
|  | Cyanex ® 272 | 0.0022 | 2.68 |
|  | Cyanex ® 923 | 0.016 | 3.57 |
| Dodecane | TBP | 0.0076 | 7.12 |
|  | DAAP | 0.0044 | 3.86 |
|  | Cyanex ® 272 | 0.0022 | 2.79 |
|  | Cyanex ® 923 | 0.017 | 3.68 |
| Isopar ® L | TBP | 0.011 | 6.92 |
|  | DAAP | 0.0072 | 4.23 |
|  | Cyanex ® 272 | 0.0050 | 3.07 |
|  | Cyanex ® 923 | 0.017 | 3.85 |
| Isopar ® M | TBP | 0.011 | 8.32 |
|  | DAAP | 0.009 | 5.0 |
|  | Cyanex ® 272 | 0.0032 | 3.38 |
|  | Cyanex ® 923 | 0.016 | 4.18 |
| 1-octanol | none | 0.081 | 28.5 |

EXAMPLE II

Another series of experiments were run in the manner described above to determine the effect of modifier concentration on $D_{Sr}$ from a 1M HNO₃ solution. In this experiment, the concentration of TBP was varied in an extraction solution of Isopar ® L containing 0.2M of crown ether at 25° C. As can be seen from the results shown in FIG. 1, the $D_{Sr}$ increases directly with the increase in modifier concentration in the extractant solution.

EXAMPLE III

An additional series of experiments were run in the manner described hereinbefore in which the concentration of the crown ether was varied in an extraction solution consisting of 1.2M TBP in Isopar ® L as the diluent. The temperature was 25° C. and the strontium was extracted from a 1M nitric acid solution.

Figure 2:
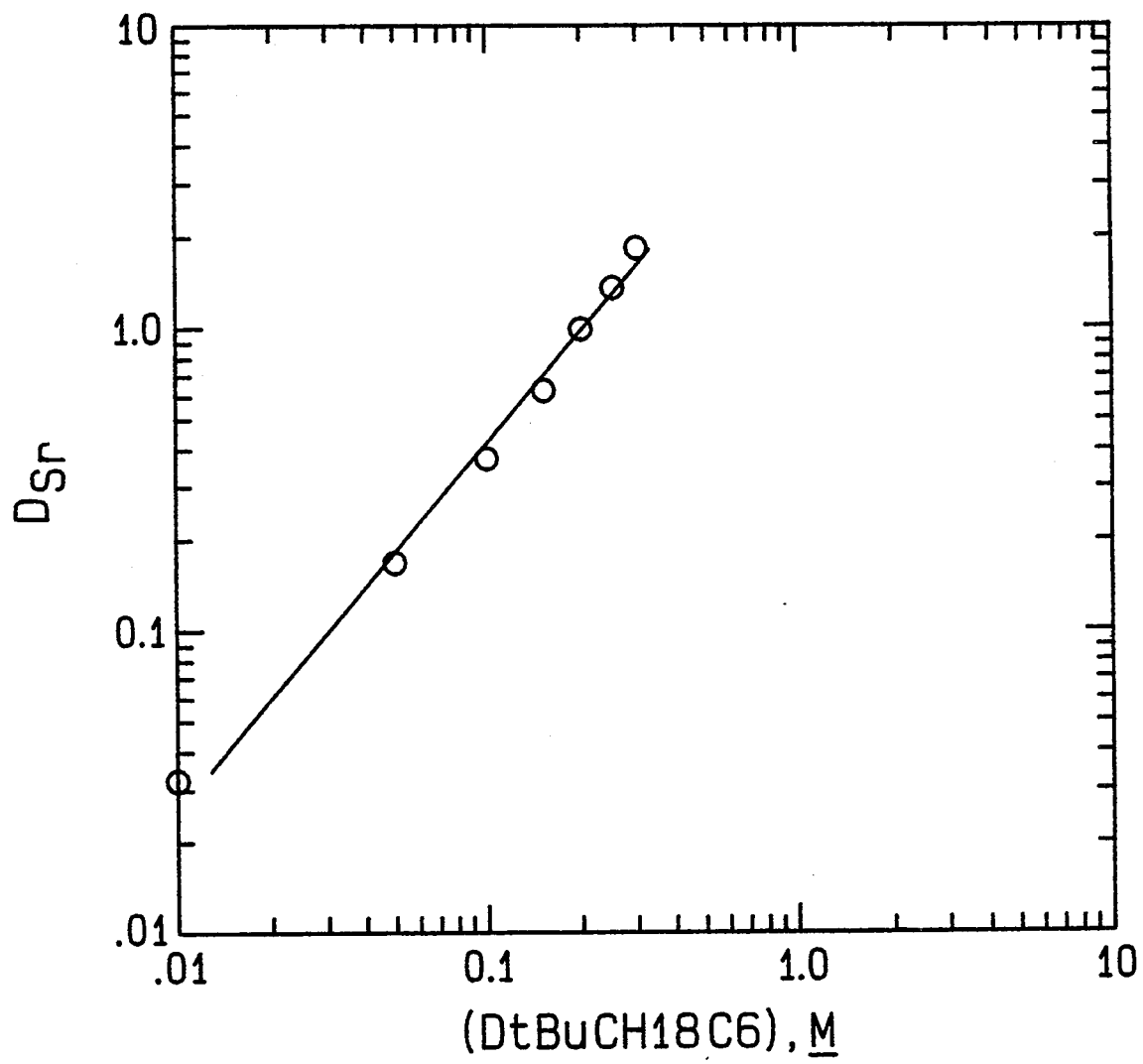
FIG. 2 is a graph of the effect of crown ether concentration on $D_{Sr}$ obtained for DtBuCH18C6 in 1.2M TBP in Isopar ® L from 1M $HNO_3$.

The results, as given in FIG. 2, show an increase in $D_{Sr}$ with an increase in crown ether concentration.

EXAMPLE IV

Figure 3:
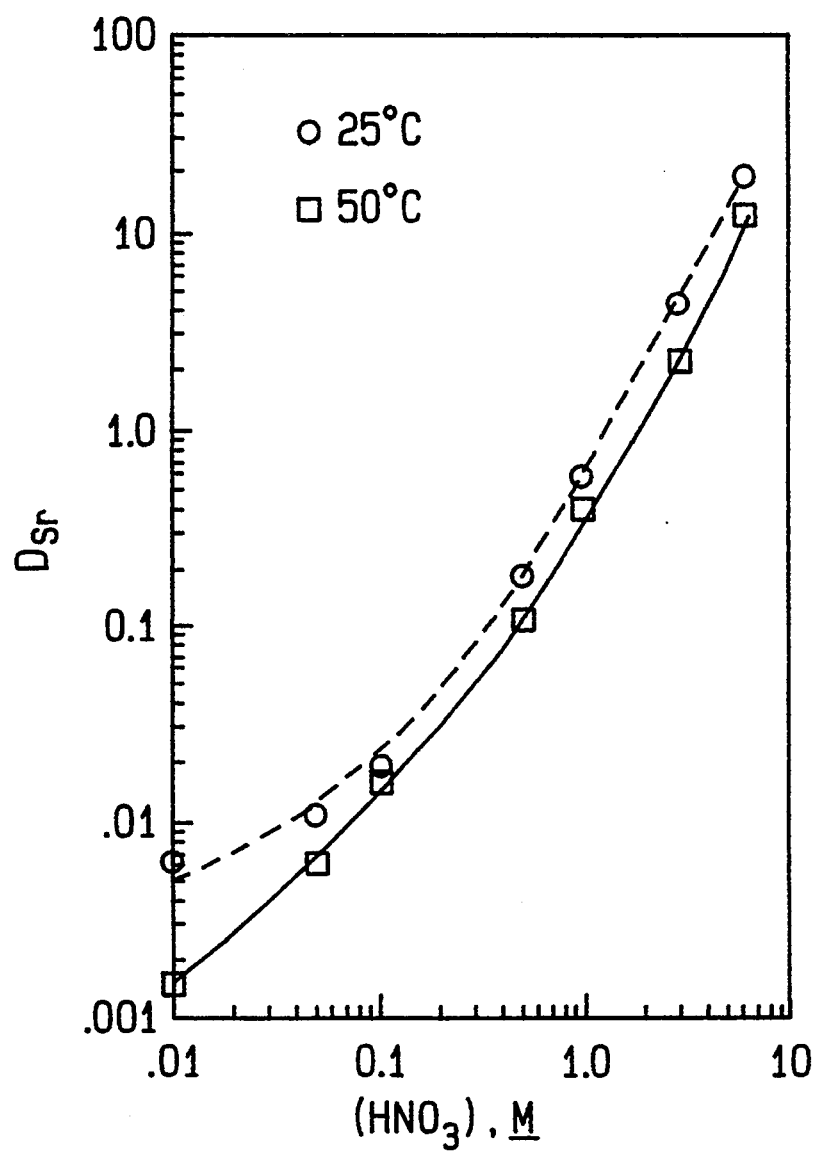
FIG. 3 is a graph of the $D_{Sr}$ for 0.2M DtBuCH18C6 in 1.2M TBP in Isopar ® L from various concentrations of $HNO_3$ at two different temperatures.

Another series of experiments were run to determine the effect of temperature and acid concentration on $D_{Sr}$. In this series, the extractant solution consisted of 0.2M crown ether and 1.2M TBP in Isopar ® L. The strontium was extracted from nitric acid solutions of varying concentrations at 25° and at 50° C. As shown by the results in FIG. 3, the $D_{Sr}$ is slightly better at 25° than at 50° C. Also from the Figure, it can be seen that the acid concentration should preferably be at least about 1M, while the upper concentration does not appear to be critical.

EXAMPLE V

Figure 4:
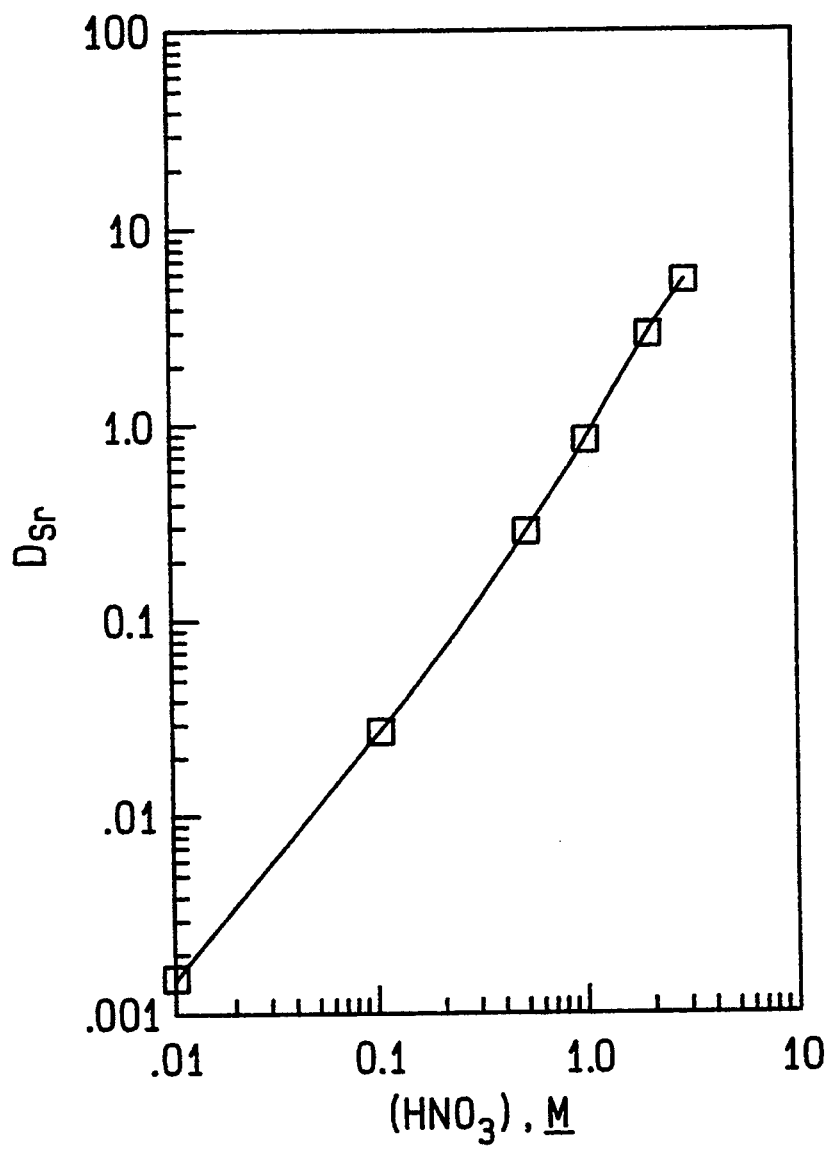
FIG. 4 is a graph of the Dsr for 0.2M DtBuCH18C6 in 1.2M diamyl amylphosphanate in Isopar L from Various concentrations of $HNO_3$.

Another series of experiments was run in the manner described in Example IV except that another phase modifier, diamyl amylphosphonate, was substituted for tributyl phosphate and that measurements were carried out only at 25° C. The results, summarized in FIG. 4, show a steady rise in $D_{Sr}$ as the aqueous phase acidity is increased and demonstrate that, as was the case in TBP system, satisfactory Sr extraction can be achieved at acid concentration above 1M.

EXAMPLE VI

A final series of experiments were run to determine the distribution ratios of the various elements found in a synthetic nuclear waste solution. The experiments were run as hereinbefore described using an extractant solution consisting of 0.2M crown ether in 1.2 M TBP and Isopar ® L at a temperature of 40° C. The concentration of the nitric acid feed solution was varied from 1 to 3 to 6 molar. For comparison, measurements were also carried out using a feed solution which was 3M in nitric acid and an organic phase consisting of 1.2M TBP in Isopar ® L without crown ether present. The results are given in Table 2 below.

TABLE 2

Effect of Acidity Upon Distribution Ratios of Dissolved Sludge Waste Constituents, 40° C. System: 0.20M DtBuCH18C6 + 1.2M TBP in Isopar ® L vs. DSW containing various nitric acid concentrations

| Element | Distribution Ratio | | | |
|---|---|---|---|---|
|  | 1M HNO₃ | 3M HNO₃ | 6M HNO₃ | 3M HNO₃ no crown ether |
| Inert Constituents | | | | |
| Na | 0.019 | 0.080 | 0.078 | 0.0091 |
| Mg | 0.016 | 0.025 | 0.026 | 0.013 |
| Al | 0.0033 | 0.0050 | 0.0061 | 0.0045 |
| Ca | 0.035 | 0.091 | 0.17 | 0.045 |
| Cr | <0.001 | <0.001 | <0.001 | <0.001 |
| Mn | <0.001 | <0.001 | <0.001 | <0.001 |
| Fe | <0.001 | <0.001 | <0.001 | <0.001 |
| Ni | <0.001 | <0.001 | <0.002 | <0.001 |
| Cu | <0.001 | <0.002 | <0.003 | <0.002 |
| Fission Products | | | | |
| Sr | 1.3 (2.1) | 6.6 (9.1) | 14.7 (19.8) | 0.001 |
| Y | 0.029 | 0.051 | 0.060 | 0.043 |
| Zr | 0.032 | 0.37 | 3.3 | 0.28 |
| Mo | <0.040 | <0.047 | <0.064 | <0.047 |

TABLE 2-continued

Effect of Acidity Upon Distribution Ratios of
Dissolved Sludge Waste Constituents, 40° C.
System: 0.20M DtBuCH18C6 + 1.2M TBP in
Isopar ® L vs. DSW containing various nitric
acid concentrations

| | Distribution Ratio | | | |
|---|---|---|---|---|
| Element | 1M HNO$_3$ | 3M HNO$_3$ | 6M HNO$_3$ | 3M HNO$_3$ no crown ether |
| Ru | 0.17 | 0.18 | 0.057 | <0.027 |
| Rh | <0.041 | <0.048 | <0.067 | <0.049 |
| Pd | <0.092 | <0.12 | <0.18 | <0.095 |
| Ag | <0.1 | 0.22 | 0.75 | 0.1 |
| Cd | <0.05 | <0.06 | <0.08 | <0.06 |
| Cs | (0.010) | (0.027) | (0.008) | NM |
| Ba | 0.57 | 1.8 | 1.7 | <0.06 |
| La | 0.033 | 0.026 | 0.024 | 0.019 |
| Ce | 0.035 | 0.030 | 0.021 | 0.018 |
| Eu | 0.056 | 0.065 | <0.05 | 0.069 |
| Nd | 0.084 | 0.10 | 0.087 | 0.037 |
| Pr | 0.062 | 0.054 | 0.040 | 0.040 |
| Sm | <0.06 | <0.06 | <0.09 | 0.09 |

( ) = radiometric determination

As has been shown by the preceding discussion and Examples, the process of the invention provides a safe and effective means for the recovery of Sr values from aqueous solutions up to 6 molar in nitric acid which contain these and other metal values.

The embodiment of the invention in which an exclusive property or privilege is claimed is defined as follows:

1. A process of recovering strontium values from an aqueous nitric acid feed solution contain this and other fission product values comprising:

contacting the aqueous feed solution containing from about 1 to 6 molar nitric acid with an organic extractant solution consisting of a crown ether in a diluent, the diluent being selected from the group consisting of a neat phase modifier and a paraffinic hydrocarbon having from 10 to 15 carbons containing a phase modifier;

maintaining the contact for a period of time sufficient for the strontium values in the feed solution to be taken up by the extractant; and separating the extractant from the feed solution, thereby separating the strontium values from the aqueous acid feed solution.

2. The process of claim 1 wherein the crown ether has the formula: 4,4'(5')[(R,R')Cyclohexano]-18-crown-6, where R and R' are one or more members selected from the group consisting of H, methyl, propyl, t-butyl, hexyl and octyl.

3. The process of claim 2 wherein the extractant solution is from 0.1 to 0.5M in crown ether.

4. The process of claim 3 wherein the diluent is selected from the group consisting of neat tri-n-butyl phosphate, and normal and iso-paraffinic hydrocarbons consisting of 10 to 15 carbons containing an organophosphorous compound as a phase modifier.

5. The process of claim 4 wherein the phase modifier is selected from the group consisting of tri-n-butyl phosphate, diamyl amylphosphonate, bis(2-, 4, 4-trimethylpentyl)phosphinic acid and a mixture of trialkylphosphine oxides of the formulas R$_3$P(O), R$_2$R'P(O), RR'$_2$P(O) and R'$_3$P(O), where R=CH$_3$(CH$_2$)$_7$ and R'=CH$_3$(CH$_2$)$_5$, said mixture having a molecular weight of about 348 and a flash point of about 182° C.

6. The process of claim 5 wherein the extractant solution contains about 1.0 to 3.0M phase modifier.

7. The process of claim 6 wherein the crown ether is selected from the group consisting of dicyclohexano-18-crown-6, bis[methylcyclohexano]-18-crown-6 and bis 4, 4'(5')[(t-butyl)cyclohexano]-18-crown-6.

8. The process of claim 7 wherein the extractant solution consists of about 0.2M bis-4,4'(5')[(t-butyl)cyclohexano]-18-crown-6 in dodecane containing about 1.2M tri-butylphosphate as a phase modifier.

9. The process of claim 8 including the additional step of contacting the loaded extractant solution with an aqueous stripping solution containing up to about 0.5M nitric acid thereby recovering the strontium values from the extractant solution.

10. A process of recovering strontium values from an aqueous acid feed solution containing these and other fission product values comprising:

contacting the aqueous feed solution containing from about 1M to about 6M nitric acid with an extractant solution of about 0.2M bis-4, 4'(5')[(t-butyl)cyclohexano]-18-crown-6 in dodecane and about 1.2M tri-n-butyl phosphate at a temperature between about 25° and about 60° C.;

maintaining the contact for at least 1 minute for the strontium values to be taken up by the extractant solution; and separating the loaded extractant solution from the aqueous solution, thereby separating the strontium from the aqueous acid feed solution.

11. The process of claim 10 including the additional step of contacting the loaded extractant solution with an aqueous stripping solution containing up to about 0.05 H nitric acid thereby recovering the strontium values from the extractant solution.

* * * * *